Jan. 4, 1966  P. F. PORTER ET AL  3,226,857
VEHICLE FOR LOADING, TRANSPORTATION AND UNLOADING OF BULK CARGO
Filed Sept. 28, 1964  3 Sheets-Sheet 1

INVENTORS
PAUL D. BORDERS,
PAUL F. PORTER
& DAVID M. REED

BY Robert G. McMorrow
ATTORNEY

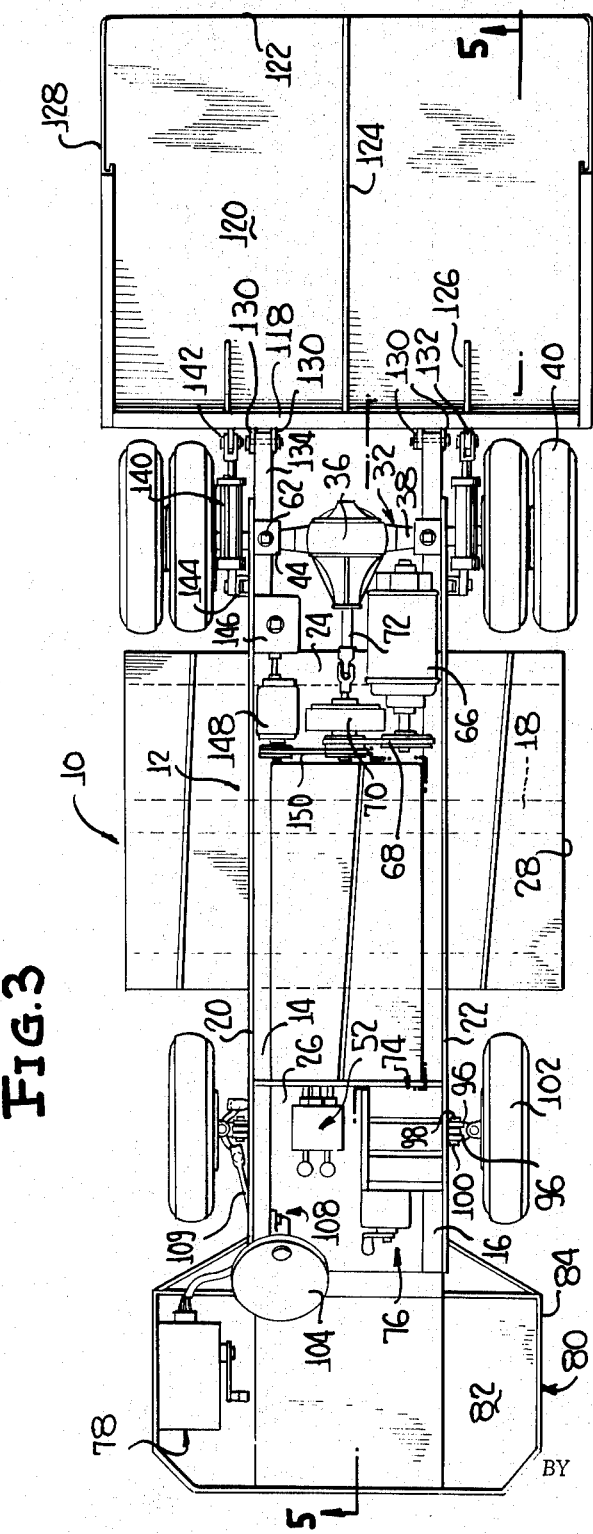

Jan. 4, 1966   P. F. PORTER ET AL   3,226,857
VEHICLE FOR LOADING, TRANSPORTATION AND UNLOADING OF BULK CARGO
Filed Sept. 28, 1964   3 Sheets-Sheet 3
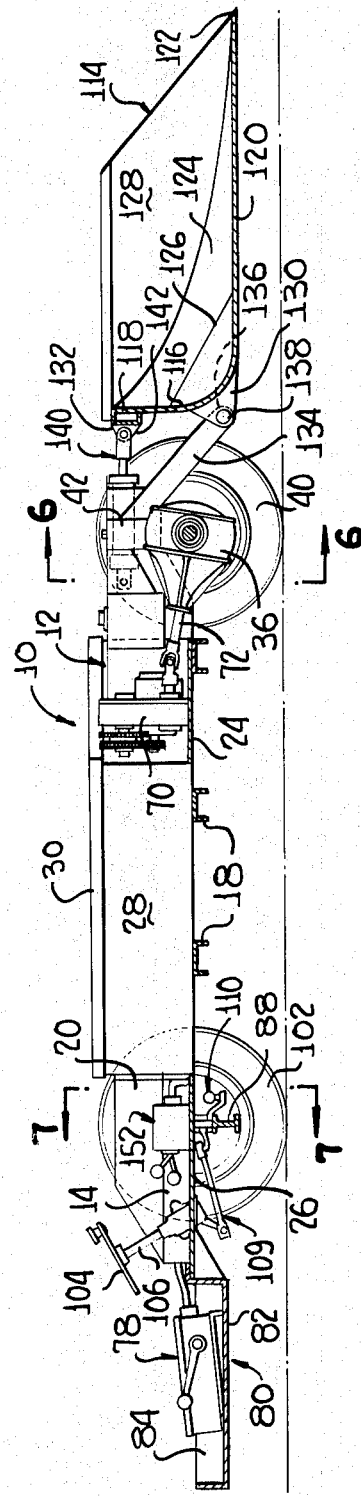
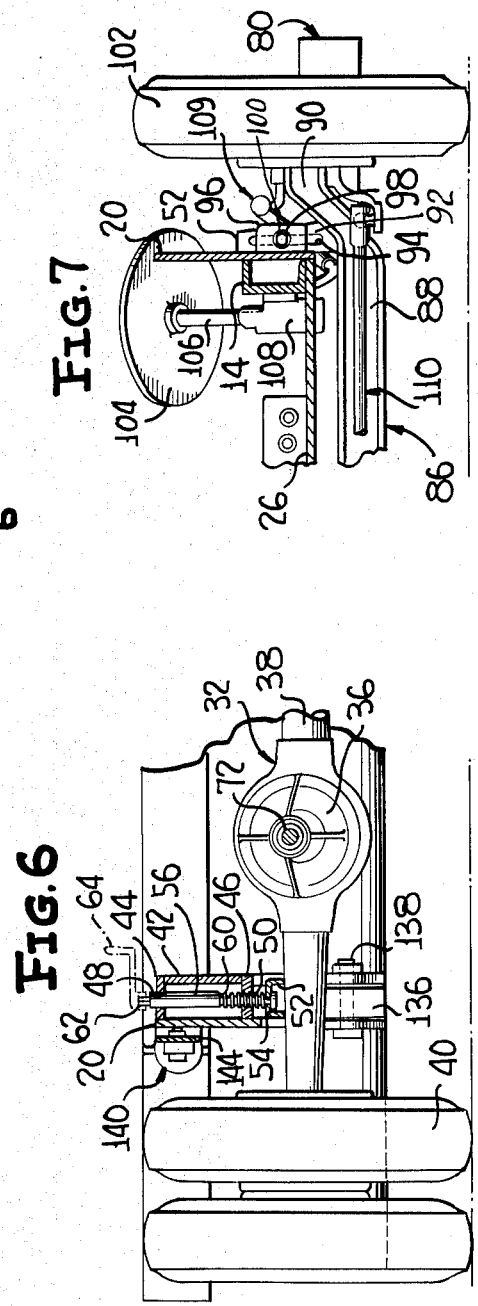
INVENTORS
PAUL D. BORDERS,
PAUL F. PORTER
& DAVID M. REED
BY Robert G. McMorrow
ATTORNEY United States Patent Office 3,226,857
Patented Jan. 4, 1966

3,226,857
VEHICLE FOR LOADING, TRANSPORTATION AND UNLOADING OF BULK CARGO
Paul F. Porter, Allen, and Paul D. Borders and David M. Reed, Langley, Ky.
Filed Sept. 28, 1964, Ser. No. 399,446
4 Claims. (Cl. 37—126)

This invention relates to a vehicle of specialized utility particularly adapted for the loading, transportation and unloading of bulk cargo from locations of difficult access, such as subterranean mine shafts, to unloading areas, such as surface discharge points.

It is a principal object of the instant invention to supply a vehicle of this nature which is substantially self-loading and unloading, and one which is capable of operation in tunnels or shafts with minimum overhead clearance adapting the vehicle to employment not only in extensive mining operations but in relatively small operations as well. In less extensive mining endeavors, particularly in mines for the removal of coal, excavation of tunneling is kept at minimum height to reduce operating expense, and hence, conventional tractors and the like cannot be used in coal or ore removal due to insufficient overhead clearance. It is an objective of the present invention to supply a vehicle adapted for use in such mine tunnels, requiring a minimum of overhead clearance.

Another important objective of the invention is to provide a vehicle as indicated, including a frame, axles, and a vertically pivotal scoop, the height of the frame above the axles being selectively variable. Height variability permits the operator of the present vehicle to change overall height as required by varying overhead clearance in different tunnels, permitting a greater inclination of the scoop in the maximum height ranges with satisfactory operation retained at the lower ranges.

A further objective is to provide a vehicle of this classification which is powered by self-contained means, the means comprising electrical storage batteries and an electrical motor.

Additional objectives include the provision of apparatus as described above which is adapted for operation with a minimum of operator training, apparatus of relatively non-complex construction and assembly, and apparatus which is low in cost in comparison to conventional removal methods.

Other and further objects and advantages of this invention will become apparent to those skilled in the art upon consideration of the following specification, when read in conjunction with the annexed drawings, in which:

FIGURE 3 is an enlarged top plan view of the vehicle;

FIGURE 4 is a schematic diagram disclosing typical wiring and hydraulic circuits employed herein;

FIGURE 5 is a vertical cross sectional view to substantially the scale of FIGURE 3, taken on the line 5—5 of that figure;

FIGURE 6 is an enlarged detail view taken on section line 6—6 of FIGURE 5, looking in the direction of the arrows; and FIGURE 7 is an enlarged detail cross sectional view, taken on the line 7—7 of FIGURE 5, looking in the direction of the arrows.

Figure 1:
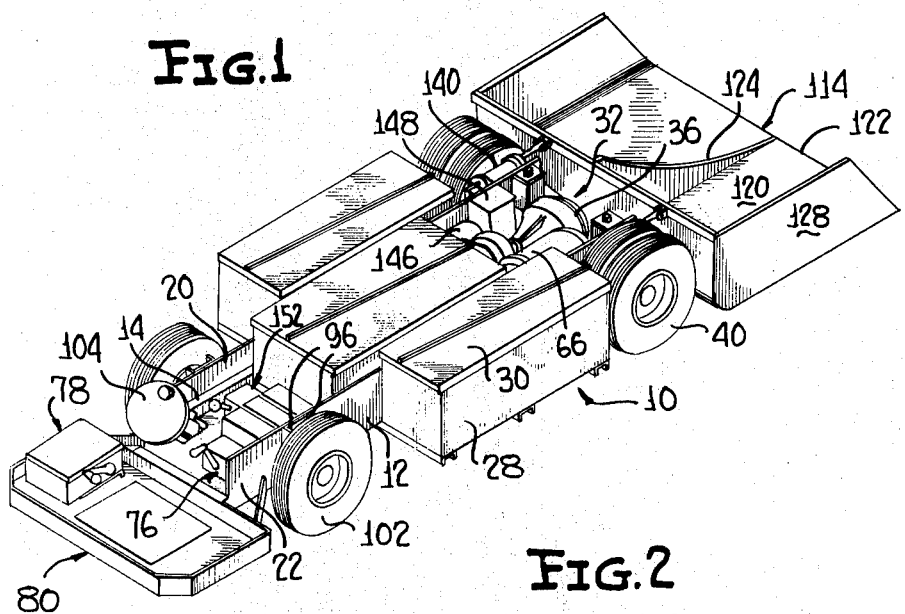
FIGURE 1 is a first perspective view of a vehicle constructed and assembled in accordance with the teachings of this invention.
Figure 2:
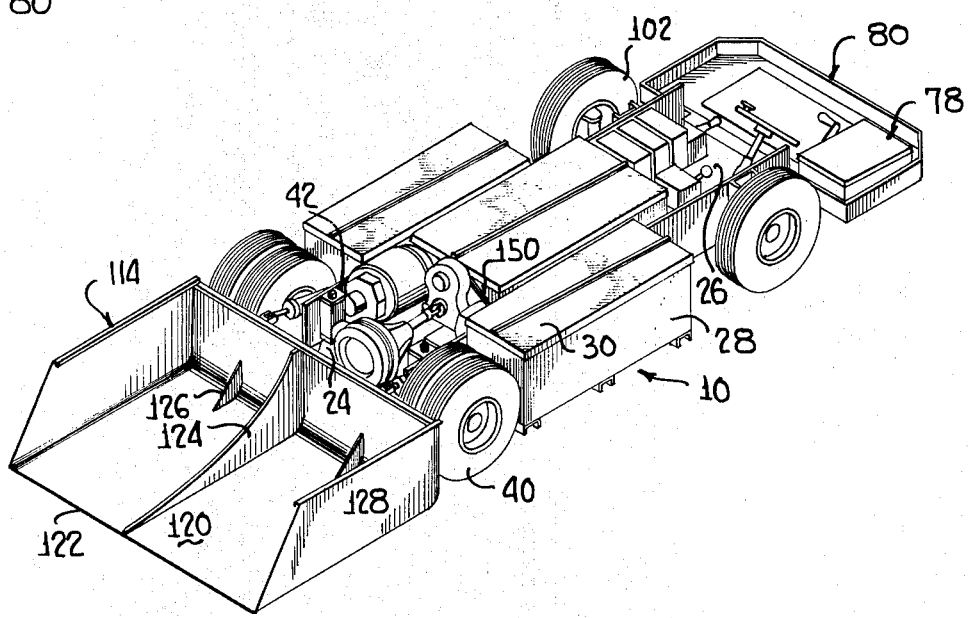
FIGURE 2 is another perspective view, taken from the front, of the vehicle of FIGURE 1.

Referring to the drawings in more detail, the vehicle hereof is therein generally identified by reference numeral 10. The vehicle 10 comprises an elongated frame 12 which includes a pair of elongated, substantially rectangular frame side members 14 and 16 and plural, transverse, spaced apart frame cross members 18. Mounted to extend along the side members 14 and 16 are frame side walls 20, 22 of substantially rectangular, flat form. The frame further includes substantially flat forward and rear decks 24 and 26, respectively.

Mounted on the cross members 18 between the forward and rear decks and both between and outwardly of the side walls is a plurality of battery boxes 28, each having a removable top 30. The boxes 28 have electrical storage batteries (not shown in detail) of any suitable type, to supply an energy source for the vehicle.

A forward, driving axle assembly 32 is provided and includes a suitable differential assembly 36 and axle housings 38 extending therefrom. Tandem ground wheels 40 are mounted on the ends of the assembly 32 and constitute the drive wheels of the apparatus.

The assembly 32 is adjustably secured to the vehicle frame 12 in such manner as to provide for selective vertical adjustment therebetween. As best seen in FIGURE 6, brackets 42 are secured inboard of the side walls 20 and 22, and each bracket 42 has a top 44 and base 46 having co-aligned openings 48, 50, respectively, formed therein—the opening 50 being threaded. A connection member 52 of substantially inverted U-shape is fixedly secured to each axle housing 38 in vertical alignment with the brackets 42, and the members 52 include apertured bight portions 54. A rod 56 having an enlarged head 58 retained by the bight 54 extends through the aperture thereof and through the openings 48 and 50 of each bracket 42. The rod 56 includes a threaded section 60 and an upper end 62 shaped for engagement by removable crank handle 64. Rotation of the rods 56 by crank handles 64 thus produces vertical variance in the distance between the axle housing sections 38 and frame 12 with a resultant change in the overall height of the vehicle at the forward end thereof.

An electric motor 66 is secured to the frame side wall 22 above the forward deck 26 by any suitable connection and is engaged by a belt drive 68 with a speed reduction assembly 70 mounted on said deck. A drive shaft 72 extends from the gear assembly 70 and is engaged with the differential 36. As set forth above, storage batteries 74 (shown diagrammatically in FIGURE 4) are housed in the boxes 28 and are connected, in series, to the motor 66, supplying the energy therefor. As further shown in FIGURE 4, and in FIGURE 5, a speed control 76 is mounted on the rear deck 24, adjacent additional batteries 74 thereon, and a master switch 78 is mounted on a riding pallet 80 (described below), adjacent the rear deck. Switch 78 also controls forward and rearward movement of the vehicle.

The riding pallet 80 comprises a substantially flat, rectangular pallet member 82 with surrounding side walls 84, secured by suitable means to the rear deck 24 and projecting outwardly therefrom. The pallet 80 provides a riding platform for the vehicle operator and is of maximum width to permit the operator to comfortably lie flat thereon when low overhead clearance is encountered.

A rear steering axle assembly 86 for the vehicle, best shown in detail in FIGURE 7, is supplied, and includes an I bar 88 with upturned ends 90. An upstanding connection ear 92 is fixedly secured to the bar 88 adjacent each end thereof and has a vertically elongated slot 94 formed therein. A pair of plates 96 extend outwardly from each of the frame side walls 20 and 22, and each pair carries a bolt 98 extended through the slot 94 of adjacent ear 92. Thus, the height of the rear axle relative to the frame is vertically adjustable by movement of the bolt in the slot, suitable securing means, such as a nut 100, being provided. Ground wheels 102 are pivotally mounted on the axle ends in the usual fashion.

Steering of the wheels 102 by the operator is accomplished by a steering wheel 104 secured to a column 106 extended into steering gear box 108 on the rear deck 26. The gear box 106 is connected through suitable mechanical linkage 109 with one wheel 102, and a tie rod assembly 110 connects each of the wheels 102 for pivotal movement together to effect the steering of the vehicle.

Mounted forwardly of the wheels is an open scoop 114 having up and down positions and being of a height in the up position (FIGURE 5) no greater than the overall vehicle height. It is also desirable that the scoop 114 be of a width at least equal to the overall vehicle width. The scoop includes a rear wall 116 with a top edge 118 reverted for rigidification, and a bottom wall 120 with a leading edge 122. A main rigidifying central gusset plate 124 is provided to prevent load shifting, from side to side, and side gusset plates 126 further strengthen the scoop and aid in preventing sidewise load shifting. Side walls 128 provide side enclosure means for the scoop. Spaced apart pairs of apertured connection plates 130 extend from the scoop rear wall 116 adjacent the bottom wall 120, and pivot connection members 132 extend from said wall adjacent its top edge 118.

An elongated arm 134 is extended downwardly and forwardly from each of the frame side members 14 and has an apertured end 136 positioned between the plates 130. The plates are pivotally secured to the end 136 by a pivot bolt 138 extended therethrough, whereby the scoop is vertically pivotal on the forward end of the vehicle frame. It will be noted that the degree of pivotal movement is controlled by the height of the vehicle frame and particularly the ends 136 of members 134.

Control of the pivoting of the scoop is through extensible and retractable hydraulic cylinders 140 pivotally secured by a clevis 142 to the connection members 132 and secured to the frame side walls 20 and 22 at their other ends by brackets 144. The cylinders 140 are connected by suitable fluid conduit means to a pump 146 and reservoir 148 on the forward deck 24. The pump is activated by a belt drive 150 from the motor 66 and the fluid conduits extend through a control box 152 located on the rear deck 26 for access by the operator. Extension of cylinders 140 causes forward pivoting of the scoop 114 with the leading edge 122 of the wall 120 against the mine floor or supporting surface. Retraction of the cylinders elevates the leading edge.

In operation, assuming that the material to be loaded has been loosened, by conventional mining procedures, the operator lowers the scoop to the position wherein the leading edge 122 bears against the mine floor and drives the vehicle forwardly until the scoop has been substantially filled with coal or ore. The scoop is then pivoted to its upper position (FIGURE 5) by retraction of the cylinders 140, and the vehicle is backed out of the mine to an unloading area wherein this procedure is reversed.

Having described and illustrated an embodiment of this invention in some detail, it will be understood that this description and illustration are offered merely by way of example, and that the invention is to be limited in scope only by the appended claims.

What is claimed is:

1. A vehicle for the loading, hauling, and discharge of material from a subterranean mine or the like having a low ceiling, the vehicle comprising:
   an elongated frame, including a pair of frame side members, and plural cross members, and including side walls;
   forward and rear decks on the frame;
   a forward axle, including a differential assembly, connected to the frame side members, and including ground wheels;
   means, including a threaded rod and bracket and a connection member secured to the forward axle at each frame side member, for vertical adjustment of the distance between the frame and the forward axle;
   an electrical motor on the forward deck;
   speed reduction means on the forward deck operatively associated with the motor;
   shaft means connecting the speed reduction means to the differential assembly;
   a plurality of storage batteries on the frame connected, in series, to the motor;
   a rear, steering axle, including upstanding connection ears with elongated slots formed therein, and ground wheels;
   a plate extending outwardly from each of the frame side walls and having a bolt projecting outwardly therefrom and engaged in the respective slots of the connection ears;
   a nut for each bolt to clamp the plates and ears to one another at selected heights of the frame relative to the steering axle;
   a riding pallet secured to the rear deck;
   a steering control on the rear deck operatively connected to the ground wheels of the steering axle;
   an open scoop including a rear wall having a top edge, a bottom wall, side walls, and upright rigidifying gusset plates, forwardly of the vehicle;
   an arm extending forwardly and downwardly from each of the frame side members, each arm including an outer end;
   spaced pairs of connection plates extending from the scoop rear wall adjacent the bottom wall and being pivotally connected to the outer ends of the arms;
   extensible and retractable hydraulic cylinders pivotally connected to the scoop rear wall adjacent its top edge, and connected to the frame side walls, whereby upon extension and retraction the scoop is vertically pivoted about the outer ends of the arms;
   an hydraulic pump and reservoir on the forward deck connected to the motor and to the cylinders; and
   hydraulic controls on the rear deck connected to the cylinders.

2. A vehicle for the loading, hauling, and discharge of material from areas with low overhead clearance, the vehicle comprising:
   an elongated frame, including a pair of frame side members, and cross members, and including side walls;
   forward and rear decks on the frame;
   a forward drive axle with ground wheels;
   means, including a threaded rod and bracket and a connection member secured to the forward axle at each frame side member, for vertical adjustment of the distance between the frame and the forward axle;
   an electrical motor on the forward deck;
   speed reduction means on the forward deck operatively associated with the motor;
   shaft means operatively connecting the speed reduction means to the forward axle;
   a plurality of storage batteries on the frame connected, in series, to the motor;
   a rear, steering axle, including upstanding connection ears with elongated slots formed therein, and ground wheels;
   a plate extending outwardly from each of the frame side walls and having a bolt projecting outwardly therefrom and engaged in the respective slots of the connection ears;
   a nut for each bolt to clamp the plates and ears to one another at selected heights of the frame relative to the steering axle;
   a riding pallet secured to the rear deck;
   a steering control on the rear deck operatively connected to the ground wheels of the steering axle;
   an open scoop including a rear wall having a top edge, a bottom wall, side walls, and upright rigidifying gusset plates, forwardly of the vehicle;
   an arm extending forwardly and downwardly from each of the frame side members, each arm including an outer end;

spaced pairs of connection plates extending from the scoop rear wall adjacent the bottom wall and being pivotally connected to the outer ends of the arms;

extensible and retractable hydraulic cylinders pivotally connected to the scoop rear wall adjacent its top edge, and connected to the frame side walls, whereby upon extension and retraction the scoop is vertically pivoted about the outer ends of the arms;

an hydraulic pump and reservoir on the forward deck connected to the motor and to the cylinders; and hydraulic controls on the rear deck connected to the cylinders.

3. A vehicle for the loading, hauling, and discharge of material from areas having low overhead clearance, the vehicle comprising:

an elongated frame having forward and rear ends;

forward and rear decks on the frame adjacent the forward and rear ends, respectively, thereof;

a forward drive axle with ground wheels mounted thereon;

means, including a threaded rod and bracket and a connection member secured to the forward axle and the frame adjacent the forward end thereof for vertical adjustment of the distance between the frame and the drive axle;

electric motor and drive means connected to the forward axle;

storage battery means mounted on the vehicle frame to supply energy to the motor means;

a rear, steering axle, including upstanding connection ears with elongated slots formed therein, and ground wheels;

a plate extending outwardly from each of the frame side walls and having a bolt projecting outwardly therefrom and engaged in the respective slots of the connection ears;

a nut for each bolt to clamp the plates and ears to one another at selected heights of the frame relative to the steering axle;

a riding pallet secured to the rear deck;

means for steering the vehicle;

an open scoop including a rear wall having a top edge, a bottom wall, side walls, and upright rigidifying gusset plates, mounted forwardly of the vehicle;

an arm extending downwardly and outwardly from the frame forward end at each side thereof, the arms including outer ends;

spaced pairs of connection plates extending from the scoop rear wall adjacent the bottom wall and being pivotally connected to the outer ends of the arms;

extensible and retractable hydraulic cylinders pivotally connected to the scoop rear wall adjacent its top edge, and connected to the frame side walls, whereby upon extension and retraction, the scoop is pivoted about the outer ends of the arms; and control means for the cylinders.

4. A vehicle for loading, hauling, and discharge of materials in areas having low overhead clearance, the vehicle comprising:

an elongated frame having forward and rear ends;

a forward axle with ground wheels mounted thereon;

means, including a stationary element and an extensible and retractable element, secured to the frame and the axle for vertical adjustment of the distance between the frame and the axle;

motor and drive means operatively connected to the axle;

battery means mounted on the vehicle to supply energy to the motor means;

a rear axle having ground wheels thereon;

means connecting the rear steering axle to the frame adjacent to the rear end thereof;

a riding pallet secured to the rear end of the frame;

means for steering the vehicle;

an open scoop mounted forwardly of the vehicle;

an arm extending from the frame forward end at each side thereof, the arms including outer ends;

means connecting the scoop to the outer ends of the arms;

extensible and retractable means pivotally connected to the scoop and to the frame, whereby upon extension and retraction, the scoop is pivoted about the outer ends of the arms; and control means for the last named extensible and retractable means.

References Cited by the Examiner
UNITED STATES PATENTS

| | | |
|---|---|---|
| 1,383,542 | 5/1921 | Hurd. |
| 1,817,478 | 8/1931 | Cook _____ 280—43.2 X |
| 2,263,028 | 11/1941 | Brownell _____ 37—124 |
| 2,749,103 | 6/1956 | Clemerzi _____ 280—43.2 X |
| 2,818,187 | 12/1957 | Cooley _____ 214—505 |
| 2,872,747 | 2/1959 | Cline _____ 37—124 |

HUGO O. SCHULZ, *Primary Examiner.*